(12) United States Patent
Lee et al.

(10) Patent No.: US 11,066,487 B2
(45) Date of Patent: Jul. 20, 2021

(54) MODIFIED CONJUGATED DIENE-BASED POLYMER AND METHOD OF PREPARING THE SAME

(71) Applicant: LG Chem, Ltd., Seoul (KR)

(72) Inventors: Hyoung Woo Lee, Daejeon (KR); No Ma Kim, Daejeon (KR)

(73) Assignee: LG Chem, Ltd.

( * ) Notice: Subject to any disclaimer, the term of this patent is extended or adjusted under 35 U.S.C. 154(b) by 454 days.

(21) Appl. No.: 16/062,927

(22) PCT Filed: Nov. 8, 2017

(86) PCT No.: PCT/KR2017/012623
§ 371 (c)(1),
(2) Date: Jun. 15, 2018

(87) PCT Pub. No.: WO2018/097517
PCT Pub. Date: May 31, 2018

(65) Prior Publication Data
US 2018/0371114 A1   Dec. 27, 2018

(30) Foreign Application Priority Data

Nov. 28, 2016 (KR) .................. 10-2016-0159347
Nov. 6, 2017  (KR) .................. 10-2017-0146778

(51) Int. Cl.
| | | |
|---|---|---|
| *C08C 19/44* | (2006.01) | |
| *C08C 19/20* | (2006.01) | |
| *C08C 19/22* | (2006.01) | |
| *C08C 19/25* | (2006.01) | |
| *C08F 236/10* | (2006.01) | |
| *C08K 3/36* | (2006.01) | |
| *C08K 5/06* | (2006.01) | |
| *C08K 5/17* | (2006.01) | |
| *C08L 15/00* | (2006.01) | |
| *C07F 7/18* | (2006.01) | |
| *B60C 1/00* | (2006.01) | |

(52) U.S. Cl.
CPC ............ *C08C 19/44* (2013.01); *C07F 7/1804* (2013.01); *C08C 19/20* (2013.01); *C08C 19/22* (2013.01); *C08C 19/25* (2013.01); *C08F 236/10* (2013.01); *C08K 3/36* (2013.01); *C08K 5/06* (2013.01); *C08K 5/17* (2013.01); *C08L 15/00* (2013.01); *B60C 1/0016* (2013.01); *C08F 2500/01* (2013.01); *C08F 2500/04* (2013.01)

(58) Field of Classification Search
CPC ......... C08C 19/44; C08C 19/20; C08C 19/22; C08C 19/25; C07F 7/1804; C08F 236/10; C08F 2500/01; C08F 2500/04; C08K 3/36; C08K 5/06; C08K 5/17; C08L 15/00; B60C 1/0016
USPC ....................................................... 524/572
See application file for complete search history.

(56) References Cited

U.S. PATENT DOCUMENTS

| | | | |
|---|---|---|---|
| 4,397,994 A | 8/1983 | Takeuchi et al. | |
| 2012/0277369 A1 | 11/2012 | Yoshida et al. | |
| 2014/0371383 A1* | 12/2014 | Hayata ..................... | C08F 8/42 524/548 |
| 2015/0298512 A1 | 10/2015 | Lim et al. | |
| 2016/0039958 A1 | 2/2016 | Luo et al. | |
| 2016/0053059 A1 | 2/2016 | Kim et al. | |
| 2016/0208024 A1 | 7/2016 | Kim et al. | |
| 2016/0368935 A1* | 12/2016 | Miura ................... | C07F 7/1804 |

FOREIGN PATENT DOCUMENTS

| | | |
|---|---|---|
| CN | 102482359 A | 5/2012 |
| CN | 104271609 A | 1/2015 |
| CN | 105017571 A | 11/2015 |
| CN | 105209268 A | 12/2015 |
| CN | 105358563 A | 2/2016 |
| CN | 105849133 A | 8/2016 |
| EP | 1136877 A2 | 9/2001 |
| EP | 3018137 A1 | 5/2016 |
| EP | 3059260 A1 | 8/2016 |
| JP | 2014025031 A | 2/2014 |
| JP | 2015520789 A | 7/2015 |
| JP | 2015206038 A | 11/2015 |
| JP | 2016125144 A | 7/2016 |
| KR | 2013044533 A * | 10/2011 |
| KR | 20130044533 A | 5/2013 |
| KR | 20140127716 A | 11/2014 |
| KR | 20150134035 A | 12/2015 |
| KR | 20160029029 A | 3/2016 |
| WO | 2004020475 A1 | 3/2004 |
| WO | 2013031599 A1 | 3/2013 |
| WO | 2014149931 A1 | 9/2014 |

* cited by examiner

*Primary Examiner* — Kelechi C Egwim
(74) *Attorney, Agent, or Firm* — Lerner, David, Littenberg, Krumholz & Mentlik, LLP

(57) ABSTRACT

The present invention relates to a modified conjugated diene-based polymer, and more particularly, provides a modified conjugated diene-based polymer including a repeating unit derived from a conjugated diene-based monomer and a functional group derived from a modifier containing a compound represented by Formula 1 at one terminal, and a method of preparing the same.

20 Claims, No Drawings

MODIFIED CONJUGATED DIENE-BASED POLYMER AND METHOD OF PREPARING THE SAME

CROSS-REFERENCE TO RELATED APPLICATIONS

The present application is a national phase entry under 35 U.S.C. § 371 of International Application No. PCT/KR2017/012623 filed Nov. 8, 2017, which claims priority from Korean Patent Application No. 10-2016-0159347 filed Nov. 28, 2016 and Korean Patent Application No. 10-2017-0146778 filed Nov. 6, 2017, all of which are incorporated herein by reference.

TECHNICAL FIELD

The present invention relates to a modified conjugated diene-based polymer, and more particularly, a modified conjugated diene-based polymer including a functional group derived from a modifier having excellent affinity with an inorganic filler and thus, having excellent processability, and good tensile strength, abrasion resistance and wet skid resistance.

BACKGROUND ART

According to the recent demand for cars having a low fuel consumption ratio, a modified conjugated diene-based polymer having modulational stability represented by wet skid resistance as well as low rolling resistance, and excellent abrasion resistance and tensile properties is required as a rubber material for tires.

In order to reduce the rolling resistance of tires, there is a method of reducing hysteresis loss of vulcanized rubber, and rebound resilience at 50° C. to 80° C., tan δ, Goodrich heating, or the like is used as an evaluation index of the vulcanized rubber. That is, it is desirable to use a rubber material having high rebound resilience at the above temperature or a low tan δ value or Goodrich heating.

Natural rubbers, polyisoprene rubbers, or polybutadiene rubbers are known as rubber materials having low hysteresis loss, but these rubbers have a limitation of low wet skid resistance. Thus, recently, conjugated diene-based polymers or copolymers such as styrene-butadiene rubbers (hereinafter, referred to as "SBR") and butadiene rubbers (hereinafter, referred to as "BR"), are prepared by emulsion polymerization or solution polymerization to be used as rubbers for tires. Among these polymerization methods, the greatest advantage of the solution polymerization in comparison to the emulsion polymerization is that the vinyl structure content and the styrene content, which specify physical properties of the rubber, may be arbitrarily adjusted and its molecular weight and physical properties may be controlled by coupling or modification. Thus, the SBR prepared by the solution polymerization is widely used as a rubber material for tires because it is easy to change a structure of the finally prepared SBR or BR, and movement of chain terminals may be reduced and a coupling force with a filler such as silica and carbon black may be increased by coupling or modification of the chain terminals.

If the solution-polymerized SBR is used as the rubber material for tires, since a glass transition temperature of the rubber is increased by increasing the vinyl content in the SBR, physical properties such as running resistance and braking force, required for tires may be controlled, and fuel consumption may also be reduced by appropriately adjusting the glass transition temperature. The solution-polymerized SBR is prepared by using an anionic polymerization initiator and is being used by coupling or modifying the chain terminals of the polymer thus formed using various modifiers. For example, U.S. Pat. No. 4,397,994 discloses a method of coupling active anions of the chain terminals of a polymer obtained by polymerizing styrene-butadiene using alkyllithium which is a monofunctional initiator in a non-polar solvent, using a binder such as a tin compound.

Meanwhile, carbon black and silica are being used as a reinforcing filler of a tire tread, wherein, if the silica is used as the reinforcing filler, low hysteresis loss and wet skid resistance may be improved. However, since the silica having a hydrophilic surface has a low affinity with a rubber in comparison to the carbon black having a hydrophobic surface, dispersibility may be poor, and thus, there is a need to use a separate silane coupling agent to improve the dispersibility or provide coupling between the silica and the rubber. Therefore, attempt of introducing a functional group having affinity or reactivity with silica into the terminal of a rubber molecule is being performed, but its effect is insufficient.

DISCLOSURE OF THE INVENTION

Technical Problem

The present invention has been devised to solve the above-mentioned problems of the conventional technique, and an object of the present invention is to provide a modified conjugated diene-based polymer including a functional group derived from a modifier having excellent affinity with an inorganic filler by including sulfur and nitrogen atoms in a molecule at the same time and, thereby exhibiting excellent processability despite having a high molecular weight, and exhibiting good tensile strength, abrasion resistance and wet skid resistance, and a method of preparing the same.

Technical Solution

To solve the above-described tasks, according to an embodiment of the present invention, there is provided a modified conjugated diene-based polymer including a repeating unit derived from a conjugated diene-based monomer and a functional group derived from a modifier including a compound represented by the following Formula 1 at one terminal:

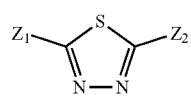

[Formula 1]

In Formula 1, $Z_1$ and $Z_2$ are each independently hydrogen, a monovalent hydrocarbon group of 1 to 30 carbon atoms, or a substituent represented by the following Formula 2, where one or more of $Z_1$ and $Z_2$ may be required to be substituents represented by the following Formula 2:

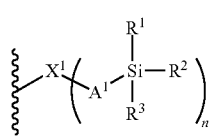

[Formula 2]

In Formula 2, $X^1$ may be a S atom or a N atom, where if $X^1$ is the S atom, n may be 1, and if $X^1$ is the N atom, n may be 2, $A^1$ may be a divalent hydrocarbon group of 1 to 30 carbon atoms, $R^1$ to $R^3$ may be each independently halogen, a monovalent hydrocarbon group of 1 to 30 carbon atoms, or an alkoxy group of 1 to 30 carbon atoms, where one or more of $R^1$ to $R^3$ may be required to be halogen groups or alkoxy groups of 1 to 30 carbon atoms.

In addition, the present invention provides a method of preparing a modified conjugated diene-based polymer, including polymerizing conjugated diene-based monomers, or an aromatic vinyl-based monomer and a conjugated diene-based monomer, in a hydrocarbon solvent including an organometal compound, to prepare an active polymer which is coupled with an organometal (S1); and reacting the active polymer and a modifier including a compound represented by the following Formula 1 (S2):

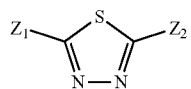

[Formula 1]

In Formula 1, the definition of each substituent is the same as defined above.

In addition, the present invention provides a modifier including the compound represented by Formula 1, and a method of preparing the same.

Advantageous Effects

In case of modifying a conjugated diene-based polymer using a modifier having excellent affinity with an inorganic filler by including sulfur and nitrogen atoms together in a molecule and according to the present invention, the polymer includes a functional group derived from the modifier at one terminal, and a modified conjugated diene-based polymer having excellent affinity with an inorganic filler may be prepared, and thus, the modified conjugated diene-based polymer thus prepared has excellent processability despite of a high molecular weight and has good tensile strength, abrasion resistance and wet skid resistance.

BEST MODE FOR CARRYING OUT THE INVENTION

Hereinafter, the present invention will be described in more detail in order to assist the understanding of the present invention.

It will be understood that words or terms used in the description and claims of the present invention shall not be interpreted as the meaning defined in commonly used dictionaries. It will be further understood that the words or terms should be interpreted as having a meaning that is consistent with their meaning of the technical idea of the invention, based on the principle that an inventor may properly define the meaning of the words or terms to best explain the invention.

A modified conjugated diene-based polymer according to the present invention may include a repeating unit derived from a conjugated diene-based monomer, and a functional group derived from a modifier including a compound represented by the following Formula 1 at one terminal:

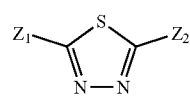

[Formula 1]

In Formula 1, $Z_1$ and $Z_2$ are each independently hydrogen, a monovalent hydrocarbon group of 1 to 30 carbon atoms, or a substituent represented by the following Formula 2, where one or more of $Z_1$ and $Z_2$ may be required to be substituents represented by the following Formula 2:

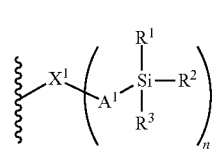

[Formula 2]

In Formula 2, $X^1$ may be a S atom or a N atom, where if $X^1$ is the S atom, n may be 1, and if $X^1$ is the N atom, n may be 2, $A^1$ may be a divalent hydrocarbon group of 1 to 30 carbon atoms, $R^1$ to $R^3$ may be each independently halogen, a monovalent hydrocarbon group of 1 to 30 carbon atoms, or an alkoxy group of 1 to 30 carbon atoms, where one or more of $R^1$ to $R^3$ may be required to be halogen groups, or alkoxy groups of 1 to 30 carbon atoms.

In a particular embodiment, in Formula 1, $Z_1$ and $Z_2$ are each independently hydrogen, or a substituent represented by the following Formula 2, where one or more of $Z_1$ and $Z_2$ may be required to be substituents represented by Formula 2, and in Formula 2, $X^1$ may be a S atom or a N atom, where if $X^1$ is the S atom, n may be 1, and if $X^1$ is the N atom, n may be 2, $A^1$ may be a divalent hydrocarbon group of 1 to 10 carbon atoms, $R^1$ to $R^3$ may be each independently halogen, a monovalent hydrocarbon group of 1 to 10 carbon atoms, or an alkoxy group of 1 to 10 carbon atoms, where one or more of $R^1$ to $R^3$ may be required to be halogen groups, or alkoxy groups of 1 to 10 carbon atoms.

In the present invention, the term "monovalent hydrocarbon group" may mean a monovalent atomic group in which carbon and hydrogen are bonded, such as a monovalent alkyl group, alkenyl group, alkynyl group, cycloalkyl group, cycloalkyl group containing one or more unsaturated bonds, and aryl group.

In the present invention, the term "divalent hydrocarbon group" may mean a divalent atomic group in which carbon and hydrogen are bonded, such as a divalent alkylene group, alkenylene group, alkynylene group, cycloalkylene group, cycloalkylene group containing one or more unsaturated bonds, and arylene group.

According to an embodiment of the present invention, the compound represented by Formula 1 may be one or more selected from the group consisting of the compounds represented by the following Formulae 1-1 to 1-4:

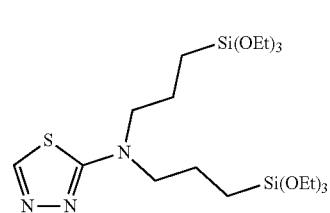

[Formula 1-1]

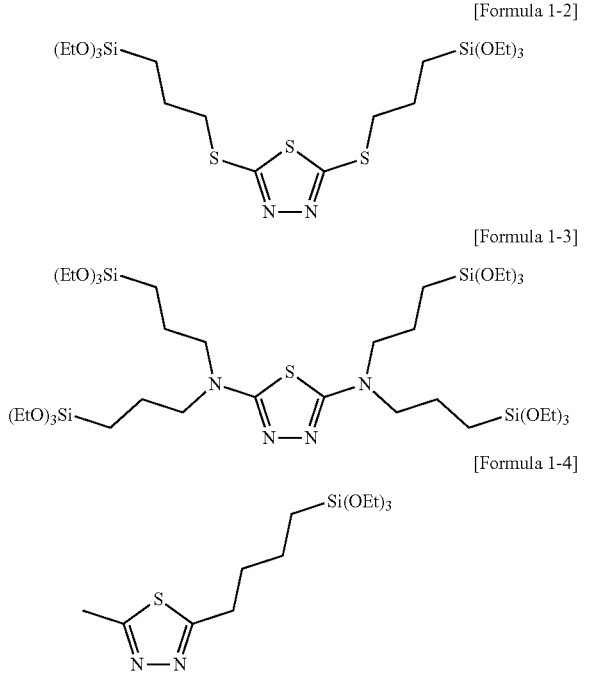

[Formula 1-2]

[Formula 1-3]

[Formula 1-4]

In Formulae 1-1 to 1-4, Et is an ethyl group.

As described above, in case of modifying a conjugated diene-based polymer using a modifier including sulfur and nitrogen atoms together in a molecule and having excellent affinity with an inorganic filler according to the present invention, the polymer includes a functional group derived from the modifier at one terminal and a modified conjugated diene-based polymer having excellent affinity with an inorganic filler may be prepared, and the modified conjugated diene-based polymer thus prepared has excellent processability despite of a high molecular weight and has good tensile strength, abrasion resistance and wet skid resistance.

The repeating unit derived from the conjugated diene-based monomer may mean a repeating unit formed by the conjugated diene-based monomer during polymerization, and the conjugated diene-based monomer may be, for example, one or more selected from the group consisting of 1,3-butadiene, 2,3-dimethyl-1,3-butadiene, piperylene, 3-butyl-1,3-octadiene, isoprene, 2-phenyl-1,3-butadiene, and 2-halo-1,3-butadiene (halo means halogen atom).

Meanwhile, a modified conjugated diene-based copolymer may be, for example, a copolymer further including a repeating unit derived from an aromatic vinyl monomer together with the repeating unit derived from the conjugated diene-based monomer.

The repeating unit derived from the aromatic vinyl monomer may mean a repeating unit formed by an aromatic vinyl monomer during polymerization, and the aromatic vinyl monomer may include, for example, one or more selected from the group consisting of styrene, α-methylstyrene, 3-methylstyrene, 4-methylstyrene, 4-propylstyrene, 1-vinylnaphthalene, 4-cyclohexylstyrene, 4-(p-methylphenyl) styrene, and 1-vinyl-5-hexylnaphthalene.

If the modified conjugated diene-based polymer is a copolymer including the repeating unit derived from the aromatic vinyl monomer, the modified conjugated diene-based polymer may include the repeating unit derived from the conjugated diene-based monomer in an amount of 50 to 95 wt %, 55 to 90 wt %, or 60 to 90 wt %, and the repeating unit derived from the aromatic vinyl monomer in an amount of 5 to 50 wt %, 10 to 45 wt %, or 10 to 40 wt %, and within these ranges, excellent rolling resistance, wet skid resistance and abrasion resistance may be achieved.

Meanwhile, the modified conjugated diene-based copolymer may be a copolymer further including a repeating unit derived from a modification monomer including a compound represented by the following Formula 3 together with the repeating unit derived from the conjugated diene-based monomer:

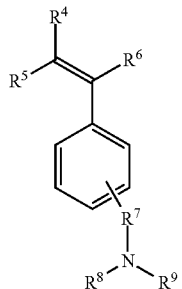

[Formula 3]

In Formula 3, $R^4$, $R^5$ and $R^6$ may be each independently hydrogen, or a monovalent hydrocarbon group of 1 to 20 carbon atoms, $R^7$ may be a single bond, a divalent hydrocarbon group of 1 to 20 carbon atoms, or a heteroalkylene group containing at least one heteroatom selected from the group consisting of $NR^{10}$, O and S, $R^8$ and $R^9$ may be each independently a monovalent hydrocarbon group of 1 to 30 carbon atoms, or a silyl group which is mono-, di, or tri-substituted with a monovalent hydrocarbon group of 1 to 30 carbon atoms, or $R^8$ and $R^9$ may be combined with each other together with an adjacent N atom to form a saturated or unsaturated cyclic structure of 3 to 20 carbon atoms, where if $R^8$ and $R^9$ form the cyclic structure, the cyclic structure may contain at least one heteroatom selected from the group consisting of $NR^{11}$, O and S, and $R^{10}$ and $R^{11}$ may be each independently a monovalent hydrocarbon group of 1 to 30 carbon atoms, or a silyl group which is mono-, di- or tri-substituted with a monovalent hydrocarbon group of 1 to 30 carbon atoms.

In a particular embodiment, the compound represented by Formula 3 may be one or more selected from the group consisting of N,N-dimethylvinylbenzylamine, N,N-diethylvinylbenzylamine, N,N-dipropylvinylbenzylamine, N,N-dibutylvinylbenzylamine, N,N-diphenylvinylbenzylamine, 2-dimethylaminoethylstyrene, 2-diethylaminoethylstyrene, 2-bis(trimethylsilyl)aminoethylstyrene, 1-(4-N,N-dimethylaminophenyl)-1-phenylethylene, N,N-dimethyl-2-(4-vinylbenzyloxy)ethylamine, N,N,N'-trimethyl-N'-(4-vinylbenzyl)ethane-1,2-diamine, N,N-dimethyl-2-((4-vinylbenzyl)thio)ethylamine, 4-(2-pyrrolidinoethyl)styrene, 4-(2-piperidinoethyl)styrene, 4-(2-hexamethyleneiminoethyl)styrene, 4-(2-morpholinoethyl)styrene, 4-(2-thiadinoethyl)styrene, 4-(2-N-methylpiperazinoethyl)styrene, 1-((4-vinylphenoxy)methyl)pyrrolidine, 1-(4-vinylbenzyloxymethyl)pyrrolidine, 1-((4-vinylbenzyl)thiomethyl)pyrrolidine, and N-methyl-1-(pyrrolidine-1-yl)-N-(4-vinylbenzyl)methylamine.

The repeating unit derived from a modification monomer including the compound represented by Formula 3 may be included at the terminal of a polymer, where substitution with a functional group derived from a modifier including the compound represented by Formula 1 occurs, and in this case, the terminal of the conjugated diene-based polymer is end-capped with the repeating unit derived from the modification monomer, thereby achieving excellent affinity with a filler, and excellent coupling efficiency during performing modification reaction of coupling reaction with a modifier.

According to an embodiment of the present invention, the copolymer may be a random copolymer, and in this case, excellent balancing effect between each of physical properties may be achieved. The random copolymer may mean a copolymer in which repeating units forming same are arranged in disorder.

The modified conjugated diene-based polymer according to an embodiment of the present invention may have a number average molecular weight (Mn) of 5,000 g/mol to 2,000,000 g/mol, 10,000 g/mol to 1,500,000 g/mol, 50,000 g/mol to 1,000,000 g/mol, or 100,000 g/mol to 500,000 g/mol, and a weight average molecular weight (Mn) of 10,000 g/mol to 10,000,000 g/mol, 50,000 g/mol to 5,000,000 g/mol, 100,000 g/mol to 3,000,000 g/mol, or 200,000 g/mol to 2,000,000 g/mol, and within these range, effects of excellent rolling resistance and wet skid resistance may be achieved. In another embodiment, the modified conjugated diene-based polymer may have molecular weight distribution (Mw/Mn) of 1 to 5, 1.2 to 4, or 1.2 to 3, and within this range, excellent balancing effect between physical properties may be achieved.

In another embodiment, the modified conjugated diene-based polymer may have a mooney viscosity of 30 to 120, 40 to 100, or 50 to 80 at 100° C., and within this range, effects of excellent processability and productivity may be achieved.

In addition, the modified conjugated diene-based polymer may have a vinyl content of 5 wt % or more, 10 wt % to 70 wt %, or 20 wt % to 50 wt %, and within this range, the glass transition temperature may be adjusted in an appropriate range, and effects of excellent rolling resistance, wet skid resistance and a low fuel consumption ratio may be achieved. Here, the vinyl content may mean the amount of not 1,4-added but 1,2-added conjugated diene-based monomer based on 100 wt % of a conjugated diene-based copolymer composed of a monomer having a vinyl group and an aromatic vinyl-based monomer.

Meanwhile, the terms "derived repeating unit" and "derived functional group" used in the present invention may mean a component or a structure derived from a certain material, or the material itself.

A method of preparing a modified conjugated diene-based polymer according to the present invention may include polymerizing conjugated diene-based monomers, or an aromatic vinyl-based monomer and a conjugated diene-based monomer, in a hydrocarbon solvent including an organometal compound, to prepare an active polymer which is coupled with an organometal (S1); and reacting the active polymer and a modifier including a compound represented by the following Formula 1 (S2):

[Formula 1]

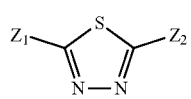

In Formula 1, the definition of each substituent is the same as defined above.

The hydrocarbon solvent is not specifically limited, but may be, for example, one or more selected from the group consisting of n-pentane, n-hexane, n-heptane, isooctane, cyclohexane, toluene, benzene and xylene.

According to an embodiment of the present invention, the compound represented by Formula 1 may be used in 0.01 mmol to 10 mmol based on total 100 g of the monomer.

According to an embodiment of the present invention, the organometal compound may be used in 0.01 mmol to 10 mmol, 0.05 mmol to 5 mmol, 0.1 mmol to 2 mmol, or 0.1 mmol to 1 mmol based on total 100 g of the monomer.

The organometal compound may be, for example, one or more selected from the group consisting of methyllithium, ethyllithium, propyllithium, n-butyllithium, s-butyllithium, t-butyllithium, hexyllithium, n-decyllithium, t-octyllithium, phenyllithium, 1-naphthyl lithium, n-eicosyl lithium, 4-butylphenyl lithium, 4-tolyl lithium, cyclohexyl lithium, 3,5-di-n-heptylcyclohexyl lithium, 4-cyclopentyl lithium, naphthyl sodium, naphthyl potassium, lithium alkoxide, sodium alkoxide, potassium alkoxide, lithium sulfonate, sodium sulfonate, potassium sulfonate, lithium amide, sodium amide, potassium amide, and lithium isopropylamide.

The polymerization of step (S1) may be performed by including a modification monomer including a compound represented by the following Formula 3:

[Formula 3]

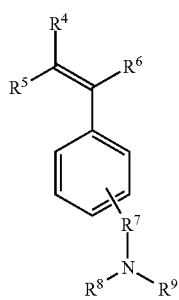

In Formula 3, the definition of each substituent is the same as defined above.

The modification monomer including the compound represented by Formula 3 may be injected, for example, together with the conjugated diene-based monomer, or the aromatic vinyl-based monomer and the conjugated diene-based monomer, or separately injected after finishing the injection of the conjugated diene-based monomer, or the aromatic vinyl-based monomer and the conjugated diene-based monomer. If the modification monomer including the compound represented by Formula 3 is injected after finishing the injection of the conjugated diene-based monomer, or the aromatic vinyl-based monomer and the conjugated diene-based monomer, effect of end-capping the terminal of the active polymer may be achieved.

Meanwhile, the polymerization of step (S1) may be performed by including a polar additive, and the polar additive may be added in an amount of 0.001 g to 50 g, 0.001 g to 10 g, or 0.005 g to 0.1 g based on total 100 g of the monomer. In addition, the polar additive may be one or more selected from the group consisting of tetrahydrofuran, ditetrahydrofurylpropane, diethyl ether, cycloamyl ether, dipropyl ether, ethylene methyl ether, ethylene dimethyl ether, diethyl glycol, dimethyl ether, tert-butoxy ethoxy ethane, bis(3-dimethylaminoethyl) ether, (dimethylaminoethyl)

ethyl ether, trimethylamine, triethylamine, tripropylamine, and tetramethylethylenediamine, preferably, triethylamine or tetramethylethylenediamine. The polar additive may be the same as or different from a polar additive which may be injected during preparing the aminosilane-based compound. If the polar additive is included and conjugated diene-based monomers, or a conjugated diene-based monomer and an aromatic vinyl-based monomer are copolymerized, the reaction rates thereof may be compensated, and effect of inducing easy formation of a random copolymer may be achieved.

The polymerization of step (S1) may be, for example, an anionic polymerization, and particularly, a living anionic polymerization by which an anionic active part is formed at the polymerization terminal through a propagation reaction by anions. In addition, the polymerization of step (S1) may be a polymerization with heating, an isothermal polymerization, or a polymerization at a constant temperature (adiabatic polymerization). Here, the polymerization at a constant temperature means a polymerization method including a step of polymerizing using self-generated heat of reaction without optionally applying heat after adding an organometal compound, and the polymerization with heating means a polymerization method including injecting the organometal compound and then, increasing the temperature by optionally applying heat. The isothermal polymerization means a polymerization method by which the temperature of a polymer is kept constant by increasing heat by applying heat or taking heat after adding the organometal compound. In addition, the polymerization of step (S1) may be conducted in a temperature range of −20° C. to 200° C., 0° C. to 150° C., or 10° C. to 120° C.

The active polymer prepared in step (S1) may mean a polymer in which a polymer anion and an organometallic cation are coupled.

According to an embodiment of the present invention, the molar ratio of the modifier including the compound represented by Formula 1 and the organometal compound may be from 1:0.1 to 1:10, and within this range, modification reaction may be performed with optimal performance, and a conjugated diene-based polymer with a high modification ratio may be obtained.

The reaction of step (S2) is a modification reaction for introducing a functional group derived from the modifier to the active polymer, and the reaction may be performed at 0° C. to 90° C. for 1 minute to 5 hours.

In addition, according to an embodiment of the present invention, the method of preparing a modified conjugated diene-based polymer may be performed by a batch type polymerization method or a continuous type polymerization method including one or more reactors.

The method of preparing a modified conjugated diene-based polymer may further include, for example, one or more steps among recovering and drying steps of a solvent and an unreacted monomer after performing step (S2) of the present invention according to need.

The modifier according to the present invention may include a compound represented by the following Formula 1:

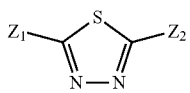
[Formula 1]

In Formula 1, the definition of each substituent may be the same as defined above.

The modifier of the present invention has excellent affinity with an inorganic filler by including a sulfur atom and a nitrogen atom at the same time in a molecule, and, particularly, a silica-based filler. Accordingly, effect of increasing dispersibility between the polymer modified by the modifier and a filler may be achieved.

Meanwhile, the modifier including the compound represented by Formula 1 may be prepared by including a step of reacting a compound represented by Formula 4 below and a compound represented by Formula 5 below.

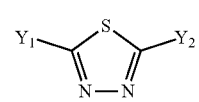
[Formula 4]

In Formula 4, $Y_1$ and $Y_2$ are each independently hydrogen, a monovalent hydrocarbon group of 1 to 30 carbon atoms, SH, or $NH_2$, where one or more of $Y_1$ and $Y_2$ are required to be SH, or $NH_2$.

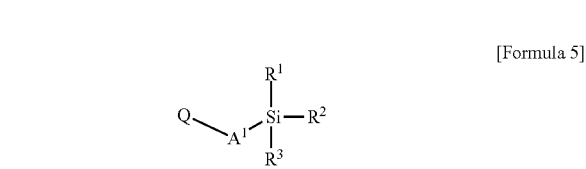
[Formula 5]

In Formula 5, Q may be a halogen group, $A^1$ may be a divalent hydrocarbon group of 1 to 30 carbon atoms, $R^1$ to $R^3$ may be each independently halogen, a monovalent hydrocarbon group of 1 to 30 carbon atoms, or an alkoxy group of 1 to 30 carbon atoms, where one or more of $R^1$ to $R^3$ are required to be halogens or alkoxy groups of 1 to 30 carbon atoms.

According to the present invention, a rubber composition including the modified conjugated diene-based polymer is provided.

The rubber composition may include the modified conjugated diene-based polymer in an amount of 10 wt % or more, 10 wt % to 100 wt %, or 20 wt % to 90 wt %. Within this range, effects of excellent mechanical properties such as tensile strength and abrasion resistance, and excellent balance between each of physical properties may be achieved.

In addition, the rubber composition may further include other rubber components, if necessary, in addition to the modified conjugated diene-based polymer, and, in this case, the rubber component may be included in an amount of 90 wt % or less based on the total weight of the rubber composition. Particularly, the other rubber components may be included in an amount of 1 part by weight to 900 parts by weight based on 100 parts by weight of the modified and conjugated diene-based copolymer.

The rubber component may be, for example, a natural rubber or a synthetic rubber, particularly, a natural rubber (NR) including cis-1,4-polyisoprene; a modified natural rubber which is obtained by modifying or purifying a common natural rubber, such as an epoxidized natural rubber (ENR), a deproteinized natural rubber (DPNR), and a hydrogenated natural rubber; and a synthetic rubber such as a styrene-butadiene copolymer (SBR), a polybutadiene (BR), a polyisoprene (IR), a butyl rubber (IIR), an ethylene-propylene copolymer, a polyisobutylene-co-isoprene, a neoprene, a poly(ethylene-co-propylene), a poly(styrene-co-butadiene), a poly(styrene-co-isoprene), a poly(styrene-co-isoprene-co-butadiene), a poly(isoprene-co-butadiene), a poly(ethylene-co-propylene-co-diene), a polysulfide rubber, an acryl rubber, a urethane rubber, a silicone rubber, an epichlorohydrin rubber, a butyl rubber, and a halogenated butyl rubber, and any one or a mixture of two or more thereof may be used.

The rubber composition may, for example, include 0.1 parts by weight to 200 parts by weight, or 10 parts by weight to 120 parts by weight of a filler based on 100 parts by weight of the modified conjugated diene-based polymer of the present invention. The filler may be, for example, a silica-based filler, particularly, wet silica (hydrated silicate), dry silica (anhydrous silicate), calcium silicate, aluminum silicate, or colloid silica. Preferably, the filler may be wet silica which has the most significant compatible effect of improving effect of destruction characteristics and wet grip. In addition, the rubber composition may further include a carbon black-based filler, if needed.

In another embodiment, if silica is used as the filler, a silane coupling agent may be used together for the improvement of reinforcing and low exothermic properties. Particular examples of the silane coupling agent may include bis(3-triethoxysilylpropyl)tetrasulfide, bis(3-triethoxysilylpropyl)trisulfide, bis(3-triethoxysilylpropyl)disulfide, bis(2-triethoxysilylethyl)tetrasulfide, bis(3-trimethoxysilylpropyl)tetrasulfide, bis(2-trimethoxysilylethyl)tetrasulfide, 3-mercaptopropyltrimethoxysilane, 3-mercaptopropyltriethoxysilane, 2-mercaptoethyltrimethoxysilane, 2-mercaptoethyltriethoxysilane, 3-trimethoxysilylpropyl-N,N-dimethylthiocarbamoyltetrasulfide, 3-triethoxysilylpropyl-N,N-dimethylthiocarbamoyltetrasulfide, 2-triethoxysilylethyl-N,N-dimethylthiocarbamoyltetrasulfide, 3-trimethoxysilylpropylbenzothiazolyltetrasulfide, 3-triethoxysilylpropylbenzolyltetrasulfide, 3-triethoxysilylpropylmethacrylatemonosulfide, 3-trimethoxysilylpropylmethacrylatemonosulfide, bis(3-diethoxymethylsilylpropyl) tetrasulfide, 3-mercaptopropyldimethoxymethylsilane, dimethoxymethylsilylpropyl-N,N-dimethylthiocarbamoyltetrasulfide, or dimethoxymethylsilylpropylbenzothiazolyltetrasulfide, and any one or a mixture of two or more thereof may be used. Preferably, bis(3-triethoxysilylpropyl) polysulfide or 3-trimethoxysilylpropylbenzothiazyltetrasulfide may be used in consideration of the improving effect of reinforcing properties.

In addition, in the rubber composition according to an embodiment of the present invention, a modified conjugated diene-based polymer in which a functional group having high affinity with silica is introduced into an active part as a rubber component is used, and the mixing amount of the silane coupling agent may be smaller than a common case. Accordingly, the silane coupling agent may be used in an amount of 1 part by weight to 20 parts by weight, or 5 parts by weight to 15 parts by weight based on 100 parts by weight of silica, and within this range, effect as a coupling agent may be sufficiently exhibited, and the gelation of the rubber component may be prevented.

The rubber composition according to an embodiment of the present invention may be sulfur crosslinkable, and may further include a vulcanizing agent. The vulcanizing agent may particularly be a sulfur powder and may be included in an amount of 0.1 parts by weight to 10 parts by weight based on 100 parts by weight of the rubber component. With the amount in the above range, elasticity and strength required for a vulcanized rubber composition may be secured, and at the same time, a low fuel consumption ratio may be excellent.

The rubber composition according to an embodiment of the present invention may further include various additives used in a common rubber industry in addition to the above-described components, particularly, a vulcanization accelerator, a process oil, a plasticizer, an antiaging agent, a scorch preventing agent, a zinc white, stearic acid, a thermosetting resin, or a thermoplastic resin.

The vulcanization accelerator may use, for example, thiazole-based compounds such as 2-mercaptobenzothiazole (M), dibenzothiazyldisulfide (DM), and N-cyclohexyl-2-benzothiazylsulfenamide (CZ), or guanidine-based compounds such as diphenylguanidine (DPG), and may be included in an amount of 0.1 parts by weight to 5 parts by weight based on 100 parts by weight of the rubber component.

The process oil acts as a softener in a rubber composition and may include, for example, a paraffin-based, naphthene-based, or aromatic compound, and an aromatic process oil may be used in consideration of tensile strength and abrasion resistance, and a naphthene-based or paraffin-based process oil may be used in consideration of hysteresis loss and properties at a low temperature. The process oil may be included, for example, in an amount of 100 parts by weight or less based on 100 parts by weight of the rubber component. With the amount in the above-described range, the deterioration of tensile strength and low exothermic properties (low fuel consumption ratio) of the vulcanized rubber may be prevented.

The antiaging agent may include, for example, N-isopropyl-N'-phenyl-p-phenylenediamine, N-(1,3-dimethylbutyl)-N'-phenyl-p-phenylenediamine, 6-ethoxy-2,2,4-trimethyl-1,2-dihydroquinoline, or a condensate of diphenylamine and acetone at a high temperature, and may be used in an amount of 0.1 parts by weight to 6 parts by weight based on 100 parts by weight of the rubber component.

The rubber composition according to an embodiment of the present invention may be obtained by mulling using a mulling apparatus such as a banbury mixer, a roll, and an internal mixer according to mixing prescription. In addition, a rubber composition having low exothermic properties and good abrasion resistance may be obtained by a vulcanization process after a molding process.

Therefore, the rubber composition may be useful to the manufacture each member for tires such as a tire tread, an under tread, a side wall, a carcass coating rubber, a belt coating rubber, a bead filler, a chafer, and a bead coating rubber, or to the manufacture of rubber products in various industries such as a vibration-proof rubber, a belt conveyor, and a hose.

Also, the present invention provides a tire manufactured using the rubber composition. Particularly, the tire may be manufactured using the rubber composition.

The tire may include a tire or a tire including a tire tread.

Hereinafter, the present invention will be explained in more detail referring to embodiments. However, the following embodiments are only for the illustration of the present invention, and the scope of the present invention is not limited thereto.

EXAMPLES

Example 1

To a 20 L autoclave reactor, 270 g of styrene, 710 g of 1,3-butadiene, 5,000 g of n-hexane, and 1.3 g of 2,2-bis(2- oxoranyl)propane as a polar additive were added, and the internal temperature of the reactor was controlled to 40° C. When the internal temperature of the reactor reached 40° C., 4 mmol of n-butyllithium was injected into the reactor, and an adiabatic reaction with heating was performed. After about 20 minutes from the reaction, 20 g of 1,3-butadiene was injected for capping the terminal of a polymer with 1,3-butadiene. After 5 minutes, 1.43 g (4 mmol) of the compound represented by Formula 1-1 below was injected, and the reaction was conducted for 15 minutes. Then, the polymerization reaction was quenched using ethanol, and 45 ml of a solution in which butylated hydroxytoluene (BHT) was dissolved in hexane as an antioxidant in 0.3 wt %, was added thereto. The polymer thus obtained was added to hot water heated using steam and stirred to remove solvents, followed by roll drying to remove remaining solvents and water to prepare a modified conjugated diene-based polymer. The analysis results of the modified conjugated diene-based polymer thus prepared are shown in Table 1 below.

[Formula 1-1]

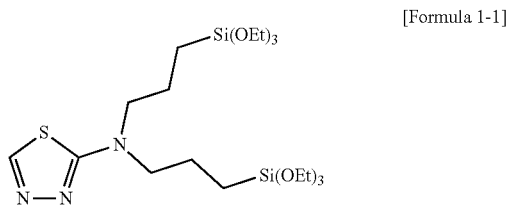

Example 2

The same method as in Example 1 was performed except for injecting 1.63 g (4 mmol) of a compound represented by 1-2 below instead of the compound represented by Formula 1-1 in Example 1.

[Formula 1-2]

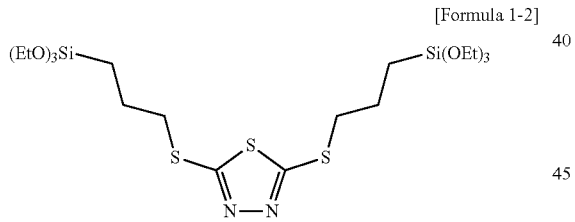

Example 3

The same method as in Example 1 was performed except for injecting 1.34 g (4 mmol) of a compound represented by 1-3 below instead of the compound represented by Formula 1-1 in Example 1.

[Formula 1-3]

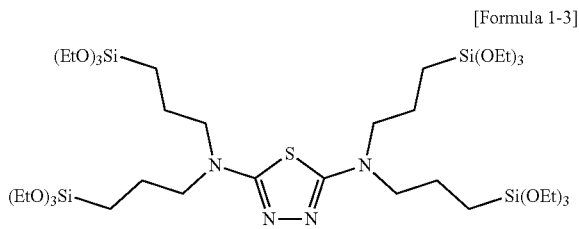

Comparative Example 1

To a 20 L autoclave reactor, 270 g of styrene, 710 g of 1,3-butadiene, 5,000 g of n-hexane, and 1.3 g of 2,2-bis(2-oxoranyl)propane as a polar additive were added, and the internal temperature of the reactor was controlled to 40° C. When the internal temperature of the reactor reached 40° C., 4 mmol of n-butyllithium was injected into the reactor, and an adiabatic reaction with heating was performed. After about 20 minutes from the reaction, 20 g of 1,3-butadiene was injected for capping the terminal of a polymer with 1,3-butadiene. Then, the polymerization reaction was quenched using ethanol, and 45 ml of a solution in which butylated hydroxytoluene (BHT) was dissolved in hexane as an antioxidant in 0.3 wt %, was added thereto. The polymer thus obtained was added to hot water heated using steam and stirred to remove solvents, followed by roll drying to remove remaining solvents and water to prepare an unmodified conjugated diene-based polymer.

Comparative Example 2

The same method as in Example 1 was performed except for injecting 0.835 g (4 mmol) of tetraethoxysilane (TESO) instead of the compound represented by Formula 1-1 in Example 1.

Comparative Example 3

The same method as in Example 1 was performed except for injecting 1.12 g (4 mmol) of N,N-diethylaminopropyl-triethoxysilane instead of the compound represented by Formula 1-1 in Example 1.

EXPERIMENTAL EXAMPLES

Experimental Example 1

With respect to each of the modified conjugated diene-based polymers prepared in the examples and the comparative examples, a weight average molecular weight (Mw, ×10$^4$ g/mol), a number average molecular weight (Mn, ×10$^4$ g/mol), molecular weight distribution (MWD), and mooney viscosity (MV) were measured. The results are shown in Table 1 below.

The weight average molecular weight (Mw), and the number average molecular weight (Mn) were measured by gel permeation chromatography (GPC) analysis, and the molecular weight distribution (MWD, Mw/Mn) was obtained by the calculation from each of the measured molecular weights. Particularly, GPC was conducted using two columns of PLgel Olexis (Polymer Laboratories Co. Ltd.) and one column of PLgel mixed-C (Polymer Laboratories Co. Ltd.) in combination, newly replaced columns were all mixed bed type columns, and polystyrene (PS) was used as a GPC standard material for calculating the molecular weights.

The mooney viscosity (MV, (ML1+4, @100° C.) MU) was measured by using MV-2000 (ALPHA Technologies Co., Ltd.) using Large Rotor at a rotor speed of 2±0.02 rpm at 100° C. In this case, a specimen used was stood at room temperature (23±3° C.) for 30 minutes or more, and 27±3 g of the specimen was collected and put in a die cavity, and then, Platen was operated for measurement for 4 minutes.

TABLE 1

| Category | Examples | | | Comparative Examples | | |
|---|---|---|---|---|---|---|
| | 1 | 2 | 3 | 1 | 2 | 3 |
| Mw (×10⁴ g/mol) | 42.1 | 47.4 | 38.2 | 24.8 | 69.7 | 48.8 |
| Mn (×10⁴ g/mol) | 32.9 | 35.1 | 31.1 | 23.3 | 49.1 | 36.9 |
| MWD (Mw/Mn) | 1.28 | 1.35 | 1.23 | 1.07 | 1.42 | 1.32 |
| MV (ML1 + 4 @100° C.) | 71 | 75 | 69 | 40.8 | 83 | 74.4 |

Referring to Table 1, the molecular weight (weight average molecular weight, Mw) and the number average molecular weight (Mn) were largely increased, and the mooney viscosity was improved for the polymers of Example 1 to Example 3 when compared to the polymer of Comparative Example 1, which was prepared by the same conditions but unmodified.

Experimental Example 2

In order to comparatively analyze the physical properties of a rubber composition including each of the modified conjugated diene-based polymers prepared in the examples and the comparative examples and a molded article manufactured therefrom, tensile properties, abrasion resistance and wet skid resistance were measured, respectively, and the results are shown in Table 3 below.

1) Preparation of Rubber Specimen

By using each of the modified conjugated diene-based polymers prepared in the examples and the comparative examples as a raw rubber, mixing was performed according to the mixing conditions shown in Table 2 below. The raw material in Table 2 is represented by parts by weight based on 100 parts by weight of rubber.

TABLE 2

| Category | Raw material | Amount (parts by weight) |
|---|---|---|
| First stage mulling | Rubber | 100.0 |
| | Silica | 70.0 |
| | Coupling agent | 11.02 |
| | Process oil | 33.75 |
| | Zinc white | 3.0 |
| | Stearic acid | 2.0 |
| | Antioxidant | 2.0 |
| | Antiaging agent | 2.0 |
| | Wax | 1.0 |
| Second stage mulling | Rubber accelerator | 1.75 |
| | Sulfur | 1.5 |
| | Vulcanization accelerator | 2.0 |

Particularly, the rubber specimen was prepared by via a first stage mulling and a second stage mulling. In the first stage mulling, a raw rubber (modified conjugated diene-based polymer), a filler, an organosilane coupling agent, a process oil, stearic acid, a zinc white, an antioxidant, an antiaging agent and wax were mixed and mulled using a banbury mixer equipped with a temperature controlling apparatus. In this case, the temperature of the mulling apparatus was controlled, and a first compound mixture was obtained at a discharge temperature of 140° C. to 150° C. In the second stage mulling, the first compound mixture was cooled to room temperature, and the first compound mixture, a rubber accelerator, sulfur and a vulcanization accelerator were added to the mulling apparatus and mixed at a temperature of 60° C. or less to obtain a second compound mixture. Then, a curing process was performed at 160° C. for a time period of 1.3 times t90 to prepare a rubber specimen.

2) Tensile Properties

The tensile properties were measured by preparing each specimen for test and measuring tensile strength when broken and tensile stress when stretched to 300% (300% modulus) of each specimen according to an ASTM 412 tensile test method. Particularly, the measurement of tensile properties was performed by using a Universal Test machin 4204 tensile tester (Instron Co., Ltd.) at room temperature at a rate of 50 cm/min.

3) Abrasion Resistance

By using an Akron abrasion tester, abrasion amount of a load of 6 pounds with 1,000 rotations was measured and indexed. The smaller the index value is, the better the abrasion resistance is.

4) Viscoelasticity Properties

Viscoelasticity properties were obtained by measuring tan δ while changing deformation at each measurement temperature (−60° C. to 60° C.) and a frequency of 10 Hz with a twist mode by using a dynamic mechanical analyzer (TA Co., Ltd.). If the tan δ at a low temperature of 0° C. is high, it means that wet skid resistance is good, and if the tan δ at a high temperature of 60° C. is low, it means that hysteresis loss is small and low rolling resistance (fuel consumption ratio) is excellent.

TABLE 3

| Category | | Example | | | Comparative Example | | |
|---|---|---|---|---|---|---|---|
| | | 1 | 2 | 3 | 1 | 2 | 3 |
| Tensile properties | 300% modulus (kgf/cm²) | 141 | 138 | 143 | 119 | 122 | 137 |
| | Tensile strength (kgf/cm²) | 190 | 194 | 188 | 148 | 163 | 183 |
| Abrasion resistance | | 95 | 92 | 93 | 92 | 100 | 94 |
| Viscoelasticity | tan δ @0° C. | 1.105 | 1.158 | 1.120 | 0.827 | 0.938 | 1.095 |
| | tan δ @60° C. | 0.086 | 0.092 | 0.091 | 0.129 | 0.113 | 0.111 |

As shown in Table 3, the modified conjugated diene-based polymers of Examples 1 to 3 according to the present invention were found to have markedly improved tensile properties, abrasion resistance and viscoelasticity properties when compared to the modified or unmodified conjugated diene-based polymers of Comparative Examples 1 to 3.

Particularly, the modified conjugated diene-based polymers of Example 1 to Example 3 showed equivalent degree of abrasion resistance, while markedly improved 300% modulus, tensile strength, tan δ at 0° C. and tan δ at 60° C. when compared to the unmodified conjugated diene-based polymer of Comparative Example 1.

In addition, the modified conjugated diene-based polymers of Example 1 to Example 3 showed markedly improved abrasion resistance, 300% modulus, tensile strength, tan δ at 0° C. and tan δ at 60° C. when compared to Comparative Examples 2 and 3, which were modified but prepared using a modifier only having ethoxysilane or ethoxysilane, and amine.

That is, if a conjugated diene-based polymer is modified using a modifier including a sulfur atom and a nitrogen atom at the same time in a molecule and having excellent affinity with an inorganic filler according to the present invention, a functional group derived from the modifier is included at the terminal of the polymer. Thus, excellent affinity with an inorganic filler may be achieved, and effects of excellent tensile properties, abrasion resistance and viscoelasticity may be achieved.

The invention claimed is:

1. A modified conjugated diene-based polymer, comprising a repeating unit derived from a conjugated diene-based monomer and a functional group derived from a modifier comprising a compound represented by the following Formula 1 at one terminal:

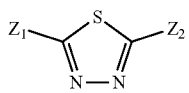

[Formula 1]

in Formula 1, $Z_1$ and $Z_2$ are each independently hydrogen, a monovalent hydrocarbon group of 1 to 30 carbon atoms, or a substituent represented by the following Formula 2, where one or more of $Z_1$ and $Z_2$ are required to be substituents represented by the following Formula 2:

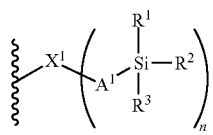

[Formula 2]

in Formula 2, $X^1$ is a S atom or a N atom, where if $X^1$ is the S atom, n is 1, and if $X^1$ is the N atom, n is 2, $A^1$ is a divalent hydrocarbon group of 1 to 30 carbon atoms, $R^1$ to $R^3$ are each independently halogen, a monovalent hydrocarbon group of 1 to 30 carbon atoms, or an alkoxy group of 1 to 30 carbon atoms, where one or more of $R^1$ to $R^3$ are required to be halogen groups, or alkoxy groups of 1 to 30 carbon atoms.

2. A modified conjugated diene-based polymer, comprising a repeating unit derived from a conjugated diene-based monomer, a repeating unit derived from a modification monomer comprising a compound represented by the following Formula 3, and a functional group derived from a modifier comprising a compound represented by the following Formula 1 at one terminal:

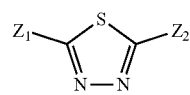

[Formula 1]

in Formula 1, $Z_1$ and $Z_2$ are each independently hydrogen, a monovalent hydrocarbon group of 1 to 30 carbon atoms, or a substituent represented by the following Formula 2, where one or more of $Z_1$ and $Z_2$ are required to be substituents represented by the following Formula 2:

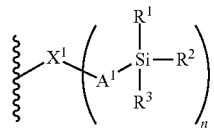

[Formula 2]

in Formula 2, $X^1$ is a S atom or a N atom, where if $X^1$ is the S atom, n is 1, and if $X^1$ is the N atom, n is 2, $A^1$ is a divalent hydrocarbon group of 1 to 30 carbon atoms, $R^1$ to $R^3$ are each independently halogen, a monovalent hydrocarbon group of 1 to 30 carbon atoms, or an alkoxy group of 1 to 30 carbon atoms, where one or more of $R^1$ to $R^3$ are required to be halogen groups, or alkoxy groups of 1 to 30 carbon atoms, provided that when $Z_1$ and $Z_2$ are both the substituents represented by Formula 2, $X^1$ for $Z_1$ and $Z_2$ are not both S atom,

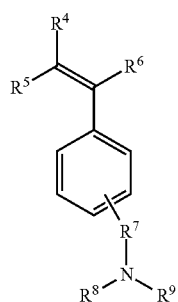

[Formula 3]

in Formula 3, $R^4$, $R^5$ and $R^6$ are each independently hydrogen, or a monovalent hydrocarbon group of 1 to 20 carbon atoms, $R^7$ is a single bond, a divalent hydrocarbon group of 1 to 20 carbon atoms, or a heteroalkylene group containing at least one heteroatom selected from the group consisting of $NR^{10}$, O and S, $R^8$ and $R^9$ are each independently a monovalent hydrocarbon group of 1 to 30 carbon atoms, or a silyl group which is mono-, di, or tri-substituted with a monovalent hydrocarbon group of 1 to 30 carbon atoms, or $R^8$ and $R^9$ are combined with each other together with the adjacent N atom to form a saturated or unsaturated cyclic structure of 3 to 20 carbon atoms, which optionally contains at least one heteroatom selected from the group consisting of $NR^{11}$, O and S, and $R^{10}$ and $R^{11}$ are each independently a monovalent hydrocarbon group of 1 to 30 carbon atoms, or a silyl group which is mono-, di- or tri-substituted with a monovalent hydrocarbon group of 1 to 30 carbon atoms.

3. The modified conjugated diene-based polymer of claim 1, wherein in Formula 1, $Z^1$ and $Z^2$ are each independently hydrogen, or a substituent represented by Formula 2, and in Formula 2, $A^1$ is a divalent hydrocarbon group of 1 to 10 carbon atoms, $R^1$ to $R^3$ are each independently halogen, a monovalent hydrocarbon group of 1 to 10 carbon atoms, or an alkoxy group of 1 to 10 carbon atoms, where one or more of $R^1$ to $R^3$ are required to be halogen groups, or alkoxy groups of 1 to 10 carbon atoms.

4. The modified conjugated diene-based polymer of claim 1, wherein the compound represented by Formula 1 is one or more selected from the group consisting of the compounds represented by the following Formulae 1-1 to 1-3:

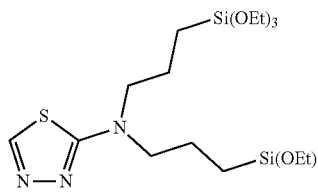
[Formula 1-1]

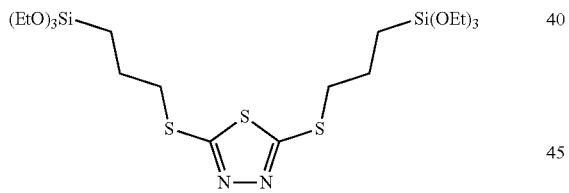
[Formula 1-2]

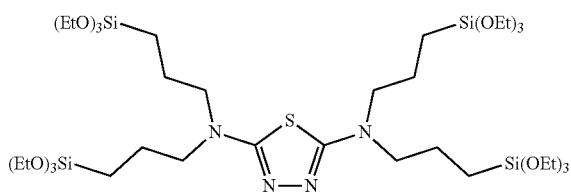
[Formula 1-3]

in Formulae 1-1 to 1-3, Et is an ethyl group.

5. The modified conjugated diene-based polymer of claim 2, wherein the compound represented by Formula 3 is one or more selected from the group consisting of N,N-dimethylvinylbenzylamine, N,N-diethylvinylbenzylamine, N,N-dipropylvinylbenzylamine, N,N-dibutylvinylbenzylamine, N,N-diphenylvinylbenzylamine, 2-dimethylaminoethylstyrene, 2-diethylaminoethylstyrene, 2-bis(trimethylsilyl)aminoethylstyrene, 1-(4-N,N-dimethylaminophenyl)-1-phenylethylene, N,N-dimethyl-2-(4-vinylbenzyloxy)ethylamine, N,N,N'-trimethyl-N'-(4-vinylbenzyl)ethane-1,2-diamine, N,N-dimethyl-2-((4-vinylbenzyl)thio)ethylamine, 4-(2-pyrrolidinoethyl)styrene, 4-(2-piperidinoethyl)styrene, 4-(2-hexamethyleneiminoethyl)styrene, 4-(2-morpholinoethyl)styrene, 4-(2-thiadinoethyl)styrene, 4-(2-N-methylpiperazinoethyl)styrene, 1-((4-vinylphenoxy)methyl)pyrrolidine, 1-(4-vinylbenzyloxymethyl)pyrrolidine, 1-((4-vinylbenzyl)thiomethyl)pyrrolidine, and N-methyl-1-(pyrrolidine-1-yl)-N-(4-vinylbenzyl)methylamine.

6. The modified conjugated diene-based polymer of claim 1, wherein the modified conjugated diene-based polymer further comprises a repeating unit derived from an aromatic vinyl monomer.

7. The modified conjugated diene-based polymer of claim 1, wherein the modified conjugated diene-based polymer has a number average molecular weight (Mn) of 5,000 g/mol to 2,000,000 g/mol.

8. The modified conjugated diene-based polymer of claim 1, wherein the modified conjugated diene-based polymer has molecular weight distribution (Mw/Mn) of 1 to 5.

9. The modified conjugated diene-based polymer of claim 2, wherein in Formula 1, $Z^1$ and $Z^2$ are each independently hydrogen, or a substituent represented by Formula 2, where one or more of $Z^1$ and $Z^2$ are required to be substituents represented by Formula 2, in Formula 2, $X^1$ is a S atom or a N atom, where if $X^1$ is the S atom, n is 1, and if $X^1$ is the N atom, n is 2, $A^1$ is a divalent hydrocarbon group of 1 to 10 carbon atoms, $R^1$ to $R^3$ are each independently halogen, a monovalent hydrocarbon group of 1 to 10 carbon atoms, or an alkoxy group of 1 to 10 carbon atoms, where one or more of $R^1$ to $R^3$ are required to be halogen groups, or alkoxy groups of 1 to 10 carbon atoms.

10. The modified conjugated diene-based polymer of claim 2, wherein the compound represented by Formula 1 is one or more selected from the group consisting of the compounds represented by the following Formulae 1-1 and 1-3:

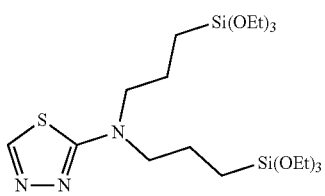
[Formula 1-1]

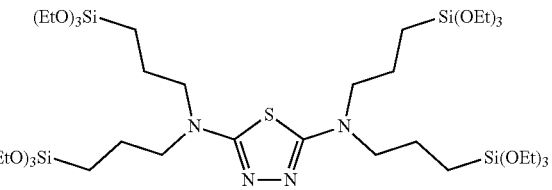
[Formula 1-3]

in Formulae 1-1 to 1-3, Et is an ethyl group.

11. The modified conjugated diene-based polymer of claim 2, wherein the modified conjugated diene-based polymer further comprises a repeating unit derived from an aromatic vinyl monomer.

12. The modified conjugated diene-based polymer of claim 2, wherein the modified conjugated diene-based polymer has a number average molecular weight (Mn) of 5,000 g/mol to 2,000,000 g/mol.

13. The modified conjugated diene-based polymer of claim 2, wherein the modified conjugated diene-based polymer has molecular weight distribution (Mw/Mn) of 1 to 5.

14. A method of preparing a modified conjugated diene-based polymer, the method comprising:
a step of polymerizing conjugated diene-based monomers, or an aromatic vinyl-based monomer and a conjugated diene-based monomer, in a hydrocarbon solvent including an organometal compound, to prepare an active polymer which is coupled with an organometal (S1); and
a step of reacting the active polymer and a modifier including a compound represented by the following Formula 1 (S2):

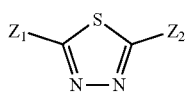
[Formula 1]

in Formula 1,
$Z_1$ and $Z_2$ are each independently hydrogen, a monovalent hydrocarbon group of 1 to 30 carbon atoms, or a substituent represented by the following Formula 2, where one or more of $Z_1$ and $Z_2$ are required to be substituents represented by the following Formula 2:

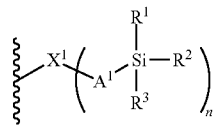
[Formula 2]

in Formula 2,
$X^1$ is a S atom or a N atom, where if $X^1$ is the S atom, n is 1, and if $X^1$ is the N atom, n is 2, $A^1$ is a divalent hydrocarbon group of 1 to 30 carbon atoms, $R^1$ to $R^3$ are each independently halogen, a monovalent hydrocarbon group of 1 to 30 carbon atoms, or an alkoxy group of 1 to 30 carbon atoms, where one or more of $R^1$ to $R^3$ are required to be halogen groups, or alkoxy groups of 1 to 30 carbon atoms.

15. The method of preparing the modified conjugated diene-based polymer of claim 14, wherein the polymerization of step (S1) is performed by including a modification monomer comprising a compound represented by the following Formula 3:

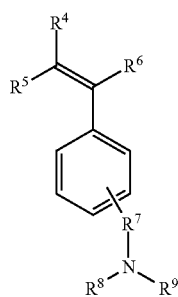
[Formula 3]

in Formula 3,
$R^4$, $R^5$ and $R^6$ are each independently hydrogen, or a monovalent hydrocarbon group of 1 to 20 carbon atoms,
$R^7$ is a single bond, a divalent hydrocarbon group of 1 to 20 carbon atoms, or a heteroalkylene group containing at least one heteroatom selected from the group consisting of $NR^{10}$, O and S
$R^8$ and $R^9$ are each independently a monovalent hydrocarbon group of 1 to 30 carbon atoms, or a silyl group which is mono-, di, or tri-substituted with a monovalent hydrocarbon group of 1 to 30 carbon atoms, or $R^8$ and $R^9$ are combined with each other together with the adjacent N atom to form a saturated or unsaturated cyclic structure of 3 to 20 carbon atoms, which optionally contains at least one heteroatom selected from the group consisting of $NR^{11}$, O and S
$R^{10}$ and $R^{11}$ are each independently a monovalent hydrocarbon group of 1 to 30 carbon atoms, or a silyl group which is mono-, di- or tri-substituted with a monovalent hydrocarbon group of 1 to 30 carbon atoms.

16. The method of preparing the modified conjugated diene-based polymer of claim 14, wherein the organometal compound is used in 0.01 mmol to 10 mmol based on total 100 g of the monomers.

17. The method of preparing the modified conjugated diene-based polymer of claim 14, wherein the organometal compound is one or more selected from the group consisting of methyllithium, ethyllithium, propyllithium, n-butyllithium, s-butyllithium, t-butyllithium, hexyllithium, n-decyllithium, t-octyllithium, phenyllithium, 1-naphthyl lithium, n-eicosyl lithium, 4-butylphenyl lithium, 4-tolyl lithium, cyclohexyl lithium, 3,5-di-n-heptylcyclohexyl lithium, 4-cyclopentyl lithium, naphthyl sodium, naphthyl potassium, lithium alkoxide, sodium alkoxide, potassium alkoxide, lithium sulfonate, sodium sulfonate, potassium sulfonate, lithium amide, sodium amide, potassium amide, and lithium isopropylamide.

18. The method of preparing the modified conjugated diene-based polymer of claim 14, wherein the polymerization of step (S1) is performed by adding a polar additive.

19. The method of preparing the modified conjugated diene-based polymer of claim 18, wherein the polar additive is one or more selected from the group consisting of tetrahydrofuran, ditetrahydrofurylpropane, diethyl ether, cycloamyl ether, dipropyl ether, ethylene dimethyl ether, ethylene dimethyl ether, diethyl glycol, dimethyl ether, tert-butoxy ethoxy ethane, bis(3-dimethylaminoethyl) ether, (dimethylaminoethyl) ethyl ether, trimethylamine, triethylamine, tripropylamine, and tetramethylethylenediamine.

20. A modifier comprising a compound represented by the following Formula 1:

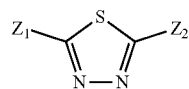
[Formula 1]

in Formula 1,
$Z_1$ and $Z_2$ are each independently hydrogen, a monovalent hydrocarbon group of 1 to 30 carbon atoms, or a substituent represented by the following Formula 2, where one or more of $Z_1$ and $Z_2$ are required to be substituents represented by the following Formula 2:

[Formula 2]

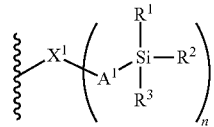

in Formula 2, $X^1$ is a S atom or a N atom, where if $X^1$ is the S atom, n is 1, and if $X^1$ is the N atom, n is 2, $A^1$ is a divalent hydrocarbon group of 1 to 30 carbon atoms, $R^1$ to $R^3$ are each independently halogen, a monovalent hydrocarbon group of 1 to 30 carbon atoms, or an alkoxy group of 1 to 30 carbon atoms, where one or more of $R^1$ to $R^3$ are required to be halogen groups, or alkoxy groups of 1 to 30 carbon atoms.

* * * * *